(12) United States Patent
Doi

(10) Patent No.: US 9,181,683 B2
(45) Date of Patent: Nov. 10, 2015

(54) ELECTRIC POWER CONTROL APPARATUS FOR CONSTRUCTION MACHINE

(71) Applicant: KOBELCO CONSTRUCTION MACHINERY CO., LTD., Hiroshima-shi (JP)

(72) Inventor: Takayuki Doi, Hiroshima (JP)

(73) Assignee: KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 0 days.

(21) Appl. No.: 14/328,138

(22) Filed: Jul. 10, 2014

(65) Prior Publication Data

US 2015/0046003 A1    Feb. 12, 2015

(30) Foreign Application Priority Data

Aug. 7, 2013  (JP) .................................. 2013-164263

(51) Int. Cl.
*H02J 7/00* (2006.01)
*E02F 9/20* (2006.01)
(Continued)

(52) U.S. Cl.
CPC ................. *E02F 9/2091* (2013.01); *B60K 1/00* (2013.01); *B60K 6/485* (2013.01); *B60L 1/00* (2013.01); *B60L 11/18* (2013.01); *B60L 11/1874* (2013.01); *B60W 10/26* (2013.01); *B60W 20/106* (2013.01);
(Continued)

(58) Field of Classification Search
CPC ........ B60L 11/14; B60L 11/18; B60W 10/26; B60W 20/00; E02F 9/20; H02J 7/00; H02J 7/14; H02J 7/34
USPC .................................... 701/22; 320/136, 150
See application file for complete search history.

(56) References Cited

U.S. PATENT DOCUMENTS 8,244,421 B2 *  8/2012  Aoki et al. ...................... 701/22
2004/0148817 A1  8/2004  Kagoshima et al.
(Continued)

FOREIGN PATENT DOCUMENTS

JP    2002-325379    11/2002

OTHER PUBLICATIONS

Extended European Search Report issued Jan. 7, 2015 in Patent Application No. 14176866.3.

*Primary Examiner* — Tan Q Nguyen
(74) *Attorney, Agent, or Firm* — Oblon, McClelland, Maier & Neustadt, L.L.P.

(57) ABSTRACT

Provided is an electric power control apparatus capable of suppressing charge/discharge with respect to an electrical storage device under an anomalous condition. The electric power control apparatus includes an electrical storage device including electrical storage modules, a module-temperature detection section, a temperature-condition judgment section, an adopted-module-temperature selection section, and a charge/discharge-electric-power-upper-limit setting section. The temperature-condition judgment section makes a judgment on a temperature condition of the electrical storage device based on a temperature detected by an electrical-storage-device temperature detection section. The charge/discharge-electric-power-upper-limit setting section sets charge/discharge electric power upper limit of the electrical storage device, based on a module temperature (Tmin) which is deviated to a side of a non-steady temperature condition and selected by the adopted-module-temperature selection section, when the electrical storage device is judged to be under the non-steady temperature condition.

7 Claims, 3 Drawing Sheets

(51) Int. Cl.
| | | |
|---|---|---|
| *B60L 11/18* | (2006.01) | |
| *B60K 1/00* | (2006.01) | |
| *B60L 1/00* | (2006.01) | |
| *B60W 10/26* | (2006.01) | |
| *H01M 10/48* | (2006.01) | |
| *H01M 10/625* | (2014.01) | |
| *H01M 10/613* | (2014.01) | |
| *B60W 20/00* | (2006.01) | |
| *B60K 6/485* | (2007.10) | |

(52) U.S. Cl.
CPC .......... *H01M 10/482* (2013.01); *H01M 10/486* (2013.01); *H01M 10/613* (2015.04); *H01M 10/625* (2015.04); *H02J 7/00* (2013.01); *B60W 2510/244* (2013.01); *B60W 2510/246* (2013.01); *E02F 9/2075* (2013.01); *Y10S 903/903* (2013.01)

(56) References Cited

U.S. PATENT DOCUMENTS

| | | | |
|---|---|---|---|
| 2007/0145954 | A1 | 6/2007 | Kawahara et al. |
| 2011/0199053 | A1* | 8/2011 | Minamiura .................... 320/136 |
| 2014/0012447 | A1* | 1/2014 | Gao et al. .......................... 701/22 |
| 2015/0046007 | A1* | 2/2015 | Wakashiro et al. ............. 701/22 |

* cited by examiner

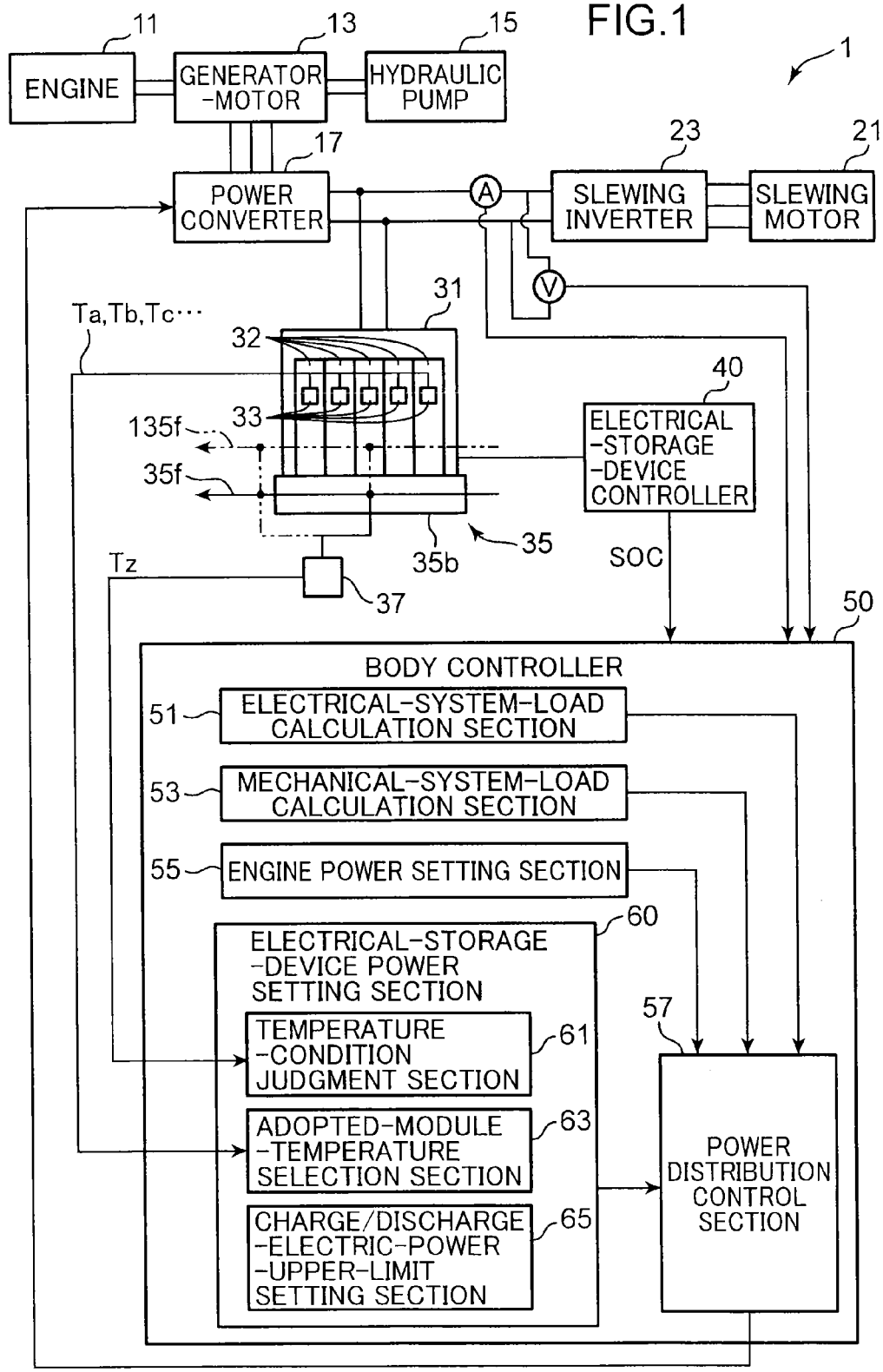

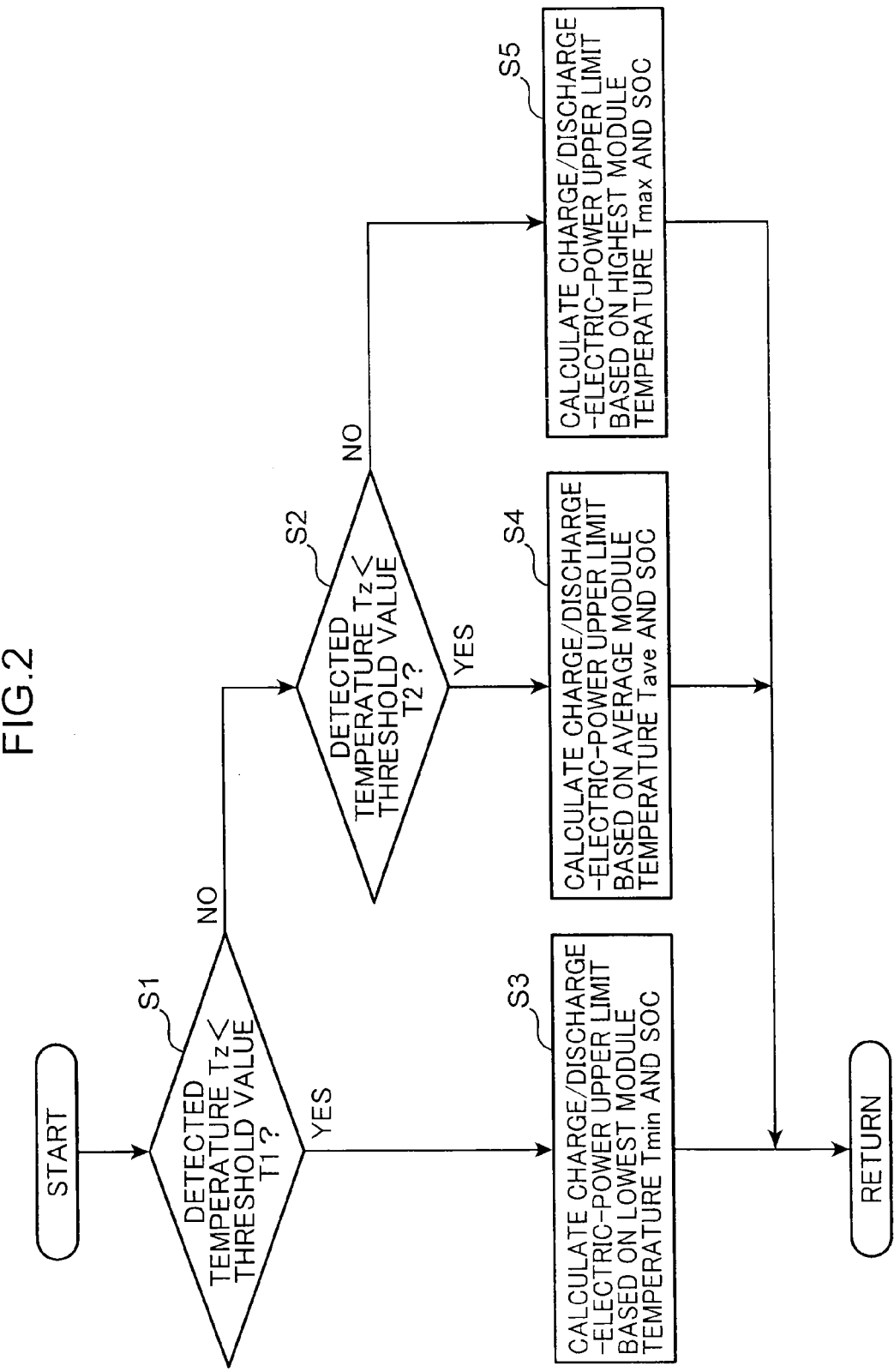

ELECTRIC POWER CONTROL APPARATUS FOR CONSTRUCTION MACHINE

BACKGROUND OF THE INVENTION

1. Field of the Invention

The present invention relates to an electric power control apparatus for a construction machine.

2. Description of the Background Art

Conventionally, there is known a construction machine provided with an electrical storage device to use electric power stored in the electrical storage device as drive source. For instance, Japanese Unexamined Patent Publication No. 2002-325379 (patent literature 1) in FIG. 4 discloses a technology of setting the upper limit of charge electric power and the upper limit of discharge electric power of an electrical storage device in accordance with the temperature (a representative temperature) of the electrical storage device.

There is an electrical storage device including a plurality of electrical storage modules. On the other hand, the internal temperature of an electrical storage device may vary depending on the cooling method or the warm-up method of the electrical storage device. Therefore, in the electrical storage device including the plurality of electrical storage modules, there can be a case where temperature difference occurs between the electrical storage modules. In this case, if the upper limit of charge electric power and the upper limit of discharge electric power of the electrical storage device are set based on the representative temperature of the electrical storage device, as disclosed in the technology of patent literature 1, a drawback may occur resulting from an improper temperature of a specific electrical storage module. Specifically, if there is an electrical storage module of a temperature lower than the representative temperature of the electrical storage device at the time of charge/discharge with respect to the electrical storage device, an over-voltage may occur in the electrical storage module. On contrary, if there exists an electrical storage module of a temperature higher than the representative temperature of the electrical storage device, the electrical storage module may be over-heated.

SUMMARY OF THE INVENTION

An object of the invention is to provide an electric power control apparatus for a construction machine, the electric power control apparatus being capable of suppressing charge and discharge with respect to an electrical storage device in an anomalous condition.

Provided by the invention is an electric power control apparatus for a construction machine, the electric power control apparatus including: a motor; an electrical storage device adapted to perform supply and receive of electric power with the motor, the electrical storage device including a plurality of electrical storage modules; an electrical-storage-device temperature detector which detects a temperature relating to the electrical storage device; a temperature-condition judgment section which judges whether the electrical storage device is under a predetermined non-steady temperature condition, based on the temperature detected by the electrical-storage-device temperature detector; a module-temperature detection section which detects a plurality of module temperatures which are respective temperatures of the electrical storage modules; an adopted-module-temperature selection section which selects the module temperature most deviated to the side of the non-steady temperature condition, from the plurality of module temperatures detected by the module-temperature detection section, as an adopted-module-temperature; and a charge/discharge-electric-power-upper-limit setting section which sets an upper limit of charge electric power and an upper limit of discharge electric power of the electrical storage device, based on the adopted-module-temperature selected by the adopted-module-temperature selection section, when the temperature-condition judgment section judges that the electrical storage device is under the non-steady temperature condition.

These and other objects, features and advantages of the present invention will become more apparent upon reading the following detailed description along with the accompanying drawings.

BRIEF DESCRIPTION OF THE DRAWINGS

FIG. 1 is a block diagram of an electric power control apparatus embodying the invention;

FIG. 2 is a flowchart illustrating an operation to be performed by an electrical-storage-device power setting section shown in FIG. 1;

DESCRIPTION OF THE PREFERRED EMBODIMENT

Figure 3A:
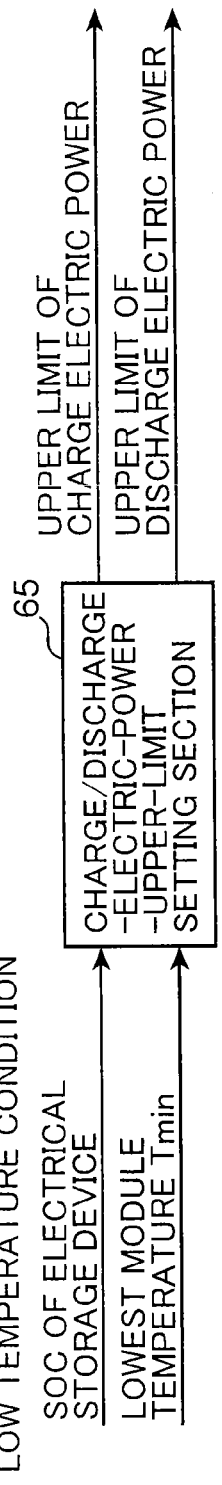
FIG. 3A is a diagram illustrating an operation to be performed by the electrical-storage-device power setting section shown in FIG. 1 in a low temperature condition.

An embodiment of the invention is described below referring to FIGS. 1 to 3C.

FIG. 1 shows an electric power control apparatus 1 according to the embodiment of the invention. The electric power control apparatus 1 includes an electrical storage device 31 and means for controlling charge and discharge with respect to the electrical storage device 31. The electric power control apparatus 1 is installed in a construction machine. The construction machine includes a not-graphically-shown lower travelling body and a not-graphically-shown upper slewing body slewably loaded on the lower travelling body. The electric power control apparatus 1 is installed in the upper slewing body. The electric power control apparatus 1 is provided in a construction machine using electric power stored in the electrical storage device 31 as at least a part of drive source, for example, a hybrid construction machine or an electrically-operated construction machine. In the following, there is described an example in which the electric power control apparatus 1 is provided in a hybrid construction machine.

The electric power control apparatus 1 includes engine-related equipment, slewing-motor-related equipment, electrical-storage-device-related equipment, an electrical-storage-device controller 40, and a body controller 50.

The engine-related equipment includes an engine 11, a generator-motor 13, a hydraulic pump 15, and a power converter 17. The engine 11 is a part of drive source for the construction machine. The generator-motor 13 is connected to an output shaft of the engine 11. The generator-motor 13 is adapted to perform an operation as a motor which assists the engine 11 in power, and to perform an operation as a generator which is driven by the engine 11 to thereby generate electric power. The hydraulic pump 15 supplies hydraulic fluid to a hydraulic actuator provided in the construction machine. The hydraulic pump 15 is connected to the output shaft of the engine 11. The hydraulic pump 15 is driven by the engine 11 and the generator-motor 13. The power converter 17 is an electric-power conversion device for allowing the generator-motor 13 and the electrical storage device 31 to perform supply and receive of electric power with each other. The power converter 17 includes a converter circuit and an inverter circuit.

The slewing-motor-related equipment includes a slewing motor and a slewing inverter 23. The slewing motor 21, which corresponds to a "motor" of the invention, is capable of slewing-drive operation of slewing the upper slewing body relatively to the lower travelling body and regenerative operation of decelerating the upper slewing body which is being slewed relatively to the lower travelling body to generate electric power. The slewing inverter 23 is an electric power conversion device for allowing the slewing motor 21 and the electrical storage device 31 to perform supply and receive of electric power with each other. The slewing inverter 23 includes an inverter circuit and a converter circuit.

The electrical-storage-device related equipment includes the electrical storage device 31, a plurality of module-temperature detectors 33, a fluid cooling device 35, and an electrical-storage-device temperature detector 37.

The electrical storage device 31 is a device that stores electric power. The electrical storage device 31 includes, for example, a battery. The electrical storage device 31 may include a capacitor, or may include a combination of a battery and a capacitor. The electrical storage device 31 performs supply and receive of electric power with the generator-motor 13 and with the slewing motor 21. The electrical storage device 31 includes not-graphically-shown electrical components and a plurality of electrical storage modules 32. Each of the electrical storage modules 32 comprises, for example, a plurality of electrical storage cells integrated with each other.

The electric power control apparatus 1 includes a voltage sensor 25 and a current sensor 27 in association with the electrical storage device 31. The voltage sensor 25 detects a terminal voltage (a battery voltage or a system voltage) of the electrical storage device 31. The voltage sensor 27 detects a current flowed from the electrical storage device 31 to the slewing inverter 23 (or to the power converter 17). Each of the voltage sensor 25 and the current sensor 27 generates a detection signal and input the generated detection signal to the body controller 50.

The module-temperature detectors 33, which constitute a module-temperature detection section, are provided for the electrical storage modules 32, respectively, to detect module temperatures Ta, Tb, Tc, . . . , which are respective temperatures of the electrical storage modules 32.

The fluid cooling device 35 is provided in the electrical storage device 31 to cool the electrical storage device 31 by cooling fluid. An example of the fluid cooling device 35 is a water-cooled cooling device to cool the electrical storage device 31 by cooling water 35f. The fluid cooling device 35 includes a block 35b, which defines a flow path in which the cooling water 35f is flowed.

The electrical-storage-device temperature detector 37 detects a temperature relating to the electrical storage device 31. The electrical-storage-device temperature detector 37 detects the temperature of the electrical storage device 31 directly or indirectly. The temperature Tz which the electrical-storage-device temperature detector 37 in the embodiment detects is a temperature of the cooling water 35f which is cooling the electrical storage device 31 or which has cooled the electrical storage device 31. More specifically, the temperature Tz which the electrical-storage-device temperature detector 37 detects is a temperature of the cooling water 35f in the block 35b, or a temperature of the cooling water 35f discharged from the block 35b.

The electrical-storage-device controller 40 calculates the SOC (State of Charge) of the electrical storage device 31.

The body controller 50 controls operations of the generator-motor 13, the slewing motor 21, and the electrical storage device 31. The body controller 50 includes an electrical-system-load calculator 51, a mechanical-system-load calculator 53, an engine-power setting section 55, a power-distribution control section 57, and an electrical-storage-device power setting section 60. The electrical-system load calculator 51 calculates an electrical system load of the generator-motor 13, the slewing motor 21 and the like. The mechanical-system-load calculator 53 calculates a mechanical system load of the hydraulic pump 15 and the like. The engine power setting section 55 gets the output of the engine 11. The electrical-storage-device power setting section 60 sets charge electric power and discharge electric power of the electrical storage device 31. The power distribution control section 57 determines distribution between the output of the engine 11 and the charge/discharge electric power with respect to the electrical storage device 31, based on respective loads calculated by the electrical-system-load calculator 51 and the mechanical-system-load calculator 53, the output set by the engine power setting section 55, and the charge/discharge electric power set by the electrical-storage-device power setting section 60. The power distribution control section 57 outputs, to the power converter 17, a torque command with respect to a torque to be output from the generator-motor 13 in accordance with the distribution.

The electrical-storage-device power setting section 60 sets the charge electric power with respect to the electrical storage device 31, i.e., the electric power with which the electrical storage device 31 is to be charged, and sets the discharge electric power with respect to the electrical storage device 31, i.e., the electric power which is to be discharged from the electrical storage device 31. The electrical-storage-device power setting section 60 includes a temperature-condition judgment section 61, an adopted-module-temperature selection section 63, and a charge/discharge-electric-power-upper-limit setting section 65.

The temperature-condition judgment section 61 makes a judgment on the temperature condition of the electrical storage device 31. The temperature-condition judgment section 61 stores respective predetermined criteria with respect to different conditions, i.e., respective criteria for "low temperature condition", "ordinary temperature condition", and "high temperature condition". The temperature-condition judgment section 61 judges the electrical storage device 31 is under which condition of "low temperature condition", "ordinary temperature condition", and "high temperature condition". In other words, the temperature-condition judgment section 61 judges: whether the electrical storage device 31 is under "low temperature condition", whether the temperature condition of the electrical storage device 31 is under "ordinary temperature condition"; and whether the temperature condition of the electrical storage device 31 is under "high temperature condition".

The temperature-condition judgment section 61 makes a judgment on the temperature condition of the electrical storage device 31, based on the temperature Tz detected by the electrical-storage-device temperature detector 37. The temperature-condition judgment section 61 stores a first condition judgment threshold value T1 and a second condition-judgment threshold value T2 for the judgment of the temperature condition of the electrical storage device 31. The second condition judgment threshold value T2 is larger than the first condition judgment threshold value T1. The temperature-condition judgment section 61 makes a judgment on the temperature condition of the electrical storage device 31, based on comparisons between the temperature Tz of the cooling water 35f detected by the electrical-storage-device temperature detector 37, and the first and second condition judgment threshold values T1 and T2. The details thereof are as follows.

1) In the case where the detected temperature Tz is lower than the first condition judgment threshold value T1, that is, in the case of YES at Step S1 in the flowchart shown in FIG. 2, the temperature-condition judgment section 61 judges that the temperature condition of the electrical storage device 31 is "low temperature condition".

2) In the case where the detected temperature Tz is not lower than the first condition judgment threshold value T1 and is lower than the second condition judgment threshold value T2, that is, in the case of NO at Step S1 and YES at Step S2 in the flowchart shown in FIG. 2, the temperature-condition judgment section 61 judges that the temperature condition of the electrical storage device 31 is "ordinary temperature condition".

3) In the case where the detected temperature Tz is not lower than the second condition judgment threshold value T2, that is, in the case of NO at either of Step S1 and Step S2 in the flowchart shown in FIG. 2, the temperature-condition judgment section 61 judges that the temperature condition of the electrical storage device 31 is "high temperature condition".

As will be described later in details, the adopted-module-temperature selection section 63 selects a module temperature to be used by the charge/discharge-electric-power-upper-limit setting section 65, from the module temperatures Ta, Tb, Tc, . . . and sets the selected module temperature as a adopted-module-temperature.

The charge/discharge-electric-power-upper-limit setting section 65 sets (calculates and determines) the upper limit of charge/discharge electric power with respect to the electrical storage device 31. Specifically, the charge/discharge-electric-power-upper-limit setting section 65 sets the upper limit of charge electric power (charge-electric-power upper limit), and the upper limit of discharge electric power (discharge-electric-power upper limit). The charge/discharge-electric-power-upper-limit setting section 65 stores a predetermined charge-electric-power-upper-limit calculation map and a predetermined discharge-electric-power-upper-limit calculation map. The charge-electric-power-upper-limit calculation map defines a relationship of the SOC of the electrical storage device 31, the temperature of the electrical storage device 31, and the upper limit of charge electric power. The discharge-electric-power-upper-limit calculation map defines a relationship of the SOC of the electrical storage device 31, the temperature (to be described later) of the electrical storage device 31, and the upper limit of discharge electric power.

Next will be described operations to be performed by the electrical-storage-device power setting section 60.

When the temperature-condition judgment section 61 judges that the electrical storage device 31 is under "low temperature condition), the electrical-storage-device power setting section 60 performs the following [Operation A-1] and [Operation A-2].

[Operation A-1]
The adopted-module-temperature selection section 63 selects the temperature most deviated to the side of the low temperature condition, i.e., a lowest module temperature Tmin corresponding to the lowest temperature, from the module temperatures Ta, Tb, Tc, . . . detected by the module-temperature detectors 33, as an adopted-module-temperature.

[Operation A-2]
As shown in FIG. 3A, the charge/discharge-electric-power-upper-limit setting section 65 sets the charge-electric-power upper limit and the discharge-electric-power upper limit of the electrical storage device 31 shown in FIG. 1, based on the lowest module temperature Tmin and the SOC (in Step S3 in FIG. 2). Assuming that the SOC of the electrical storage device 31 be a fixed value, the charge-electric-power upper limit when the temperature condition of the electrical storage device 31 is "low temperature condition" is set to a value smaller than the charge-electric-power upper limit when the temperature condition of the electrical storage device 31 is "ordinary temperature condition". The same idea is applied to the discharge-electric-power upper limit. Thus setting the charge-electric-power upper limit and the discharge-electric-power upper limit makes it possible to suppress charge/discharge with respect to the electrical storage device 31 under over-voltage condition.

When the temperature-condition judgment section 61 judges that the electrical storage device 31 is under "ordinary temperature condition", the electrical-storage-device power setting section 60 performs the following [Operation B-1] and [Operation B-2].

[Operation B-1]
The adopted-module-temperature selection section 63 calculates an average module temperature Tave, which is the average temperature of the module temperatures Ta, Tb, Tc, . . . detected by the module-temperature detectors 33, as an adopted-module-temperature.

Figure 3B:
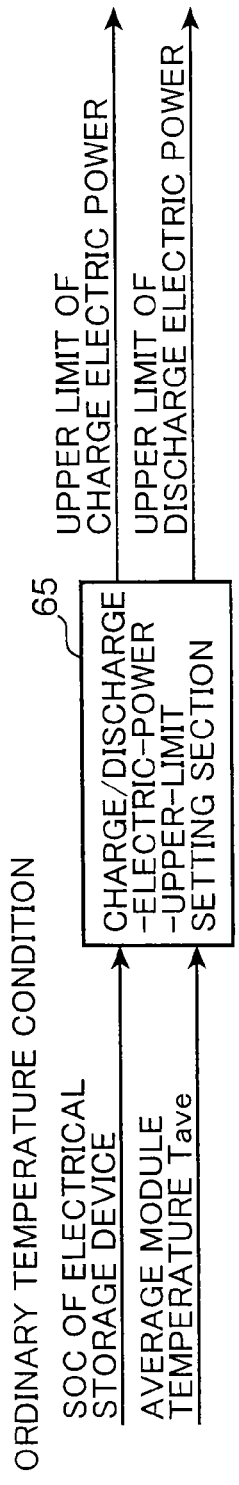
FIG. 3B is a diagram illustrating an operation to be performed by the electrical-storage-device power setting section shown in FIG. 1 in an ordinary temperature condition.

[Operation B-2]
As shown in FIG. 3B, the charge/discharge-electric-power-upper-limit setting section 65 sets the charge-electric-power upper limit and the discharge-electric-power upper limit with respect to the electrical storage device 31 shown in FIG. 1, based on the average module temperature Tave and the SOC (in Step S4 in FIG. 2).

When the temperature-condition judgment section 61 judges that the electrical storage device 31 is under "high temperature condition", the electrical-storage-device power setting section 60 performs the following [Operation C-1] and [Operation C-2].

[Operation C-1]
The adopted-module-temperature selection section 63 selects the temperature most deviated to the side of the high temperature condition, i.e., a highest module temperature Tmax corresponding to the highest temperature, from the module temperatures Ta, Tb, Tc, . . . detected by the module-temperature detectors 33, as an adopted-module-temperature.

Figure 3C:
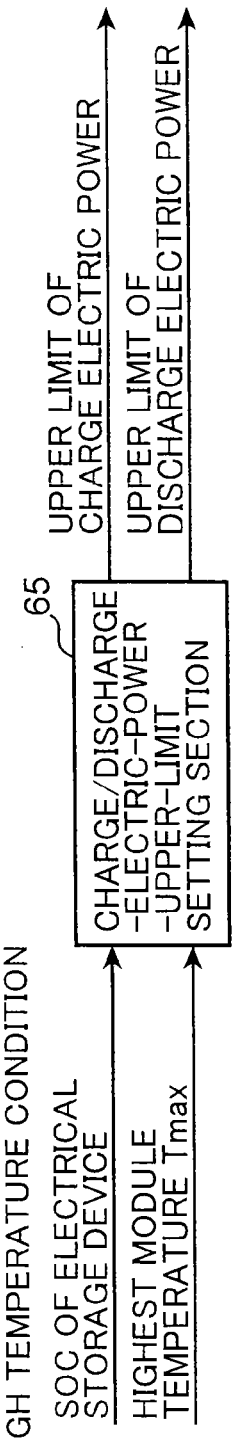
FIG. 3C is a diagram illustrating an operation to be performed by the electrical-storage-device power setting section shown in FIG. 1 in a high-temperature condition.

[Operation C-2]
As shown in FIG. 3C, the charge/discharge-electric-power-upper-limit setting section 65 sets the charge-electric-power upper limit and the discharge-electric-power upper limit with respect to the electrical storage device 31 shown in FIG. 1, based on the highest module temperature Tmax and the SOC (in Step S5 in FIG. 2). Assuming that the SOC of the electrical storage device 31 be a fixed value, the charge-electric-power upper limit when the temperature condition of the electrical storage device 31 is "high temperature condition" is set to a value smaller than the charge-electric-power upper limit when the temperature condition of the electrical storage device 31 is "ordinary temperature condition". The same idea is applied to the discharge-electric-power upper limit. Thus setting the charge-electric-power upper limit and the discharge-electric-power upper limit makes it possible to suppress charge/discharge with respect to the electrical storage device 31 under an over-heated condition.

The electric power control apparatus 1 described above exerts the following advantageous effects.

(1) Suppression of Over-voltage of Electrical Storage Device 31 (Over-voltage Suppression Effect)

The electric power control apparatus 1 includes: at least one of the generator-motor 13 and the slewing motor 21; the electrical storage device 31 which performs supply and receive of electric power with the motor and includes the electrical storage modules 32; the electrical-storage-device temperature detector 37 which detects the temperature Tz relating to the electrical storage device 31; the temperature-condition judgment section 61; the module-temperature detectors 33 which detect respective temperatures of the electrical storage modules 32; the adopted-module-temperature selection section 63 which selects the lowest module temperature Tmin corresponding to the lowest temperature from the module temperatures Ta, Tb, Tc, . . . detected by the module-temperature detectors 33; and the charge/discharge-electric-power-upper-limit setting section 65.

The temperature-condition judgment section 61 judges whether the temperature condition of the electrical storage device 31 corresponds to the predetermined "low temperature condition", based on the temperature Tz detected by the electrical-storage-device temperature detector 37. When the temperature-condition judgment section 61 judges that the electrical storage device 31 is under "low temperature condition", the charge/discharge-electric-power-upper-limit setting section 65 sets the charge-electric-power upper limit and the discharge-electric-power upper limit of the electrical storage device 31, based on the lowest module temperature Tmin selected by the adopted-module-temperature selection section 63. Since lower temperature of the electrical storage module 32 makes higher internal resistance of the electrical storage module 32 during charge/discharge to thereby permit an over-voltage condition to be easily caused, the charge/discharge-electric-power-upper-limit setting section 65, which sets the charge-electric-power upper limit and the discharge-electric-power upper limit based on the temperature of the electrical storage module 32 which is most likely to cause the over-voltage condition, can suppress the over-voltage condition of the electrical storage device 31 during the charge/discharge. Further, setting the criterion (the range of the temperature Tz) for the judgment of "low temperature condition" to a condition under which the over-voltage condition is likely to occur as described above makes it possible to suppress the charge/discharge with respect to the electrical storage device 31 under over-voltage condition.

(2) Suppression of Over-heat of Electrical Storage Device 31 (Over-heat Suppression Effect)

The temperature-condition judgment section 61 judges whether the temperature condition of the electrical storage device 31 corresponds to the predetermined "high temperature condition", based on the temperature Tz detected by the electrical storage device temperature detector 37. The adopted-module-temperature selection section 63 selects the highest module temperature Tmax corresponding to the highest temperature from the module temperatures Ta, Tb, Tc, . . . detected by the module-temperature detectors 33. When the temperature-condition judgment section 61 judges that electrical storage device 31 is under "high temperature condition", the charge/discharge-electric-power-upper-limit setting section 65 sets the charge electric power upper limit and the discharge electric power upper limit of the electrical storage device 31, based on the highest module temperature Tmax selected by the adopted-module-temperature selection section 63. Since higher temperature of the electrical storage module 32 is more likely to cause a problem of over heat of the electrical storage module 32 during charge/discharge, the charge/discharge-electric-power-upper-limit setting section 65, which sets the charge-electric-power upper limit and the discharge-electric-power upper limit based on the temperature of the electrical storage module 32 which temperature is most likely to cause the over-heat problem can suppress the over heat of the electrical storage device 31 during the charge/discharge. Further, setting the criterion (the range of the temperature Tz) for the judgment of "high temperature condition" to the condition under which the over heat is most likely to occur as described above makes it possible to suppress the charging/discharging with respect to the electrical storage device 31 under the over-heated condition.

(3) Making Use of Ability of Electrical Storage Device 31

The temperature-condition judgment section 61 judges whether the temperature condition of the electrical storage device 31 corresponds to the predetermined "ordinary temperature condition", based on the temperature Tz detected by the electrical storage device temperature detector 37. The adopted-module-temperature selection section 63 calculates the average module temperature Tave, which is the average temperature of the module temperatures Ta, Tb, Tc, . . . detected by the module-temperature detectors 33. When the temperature-condition judgment section 61 judges that the electrical storage device is under "ordinary temperature condition", the charge/discharge-electric-power-upper-limit setting section 65 sets the charge-electric-power upper limit and the discharge-electric-power upper limit of the electrical storage device 31, based on the average module temperature Tave calculated by the adopted-module-temperature selection section 63.

The charge electric power upper limit and the discharge electric power upper limit, if being constantly set based on the lowest module temperature Tmin or based on the highest module temperature Tmax, might be excessively limited in spite of the condition under which problem of over-voltage or over-heat is not likely to occur in the electrical storage device 31; in contrast, setting the charge-electric-power upper limit and the discharge-electric-power upper limit based on the average module temperature Tave when the temperature-condition judgment section 61 judges that the electrical storage device 31 is under "ordinary temperature condition" suppresses the problem of excessive limitation of the ability of the electrical storage device 31 in spite of the condition under which neither over-voltage nor over-heat is likely to occur, thereby enabling ability of the electrical storage device 31 to be effectively used. Further, setting the criterion (the range of the temperature Tz) for the judgment of "ordinary temperature condition" to the condition under which neither over-voltage nor over-heat is likely to occur as described above allows the electrical storage device 31 to be appropriately utilized.

(4) Accurate Judgment of Temperature Condition of Electrical Storage Device 31

The electric power control apparatus 1 includes the fluid cooling device 35 for cooling the electrical storage device 31 by cooling fluid (e.g. the cooling water 35f). The temperature Tz which the electrical-storage-device temperature detector 37 detects is the temperature Tz of the cooling water 35f which is cooling or has already cooled the electrical storage device 31. The temperature-condition judgment section 61 is given the first and second condition judgment threshold values T1 and T2 for the judgment on the temperature condition of the electrical storage device 31 in advance. The temperature-condition judgment section 61 can make an accurate judgment on the temperature condition of the electrical storage device 31 based on the comparison between the temperature Tz of the cooling water 35*f* detected by the electrical-storage-device temperature detector 37 and the first and second condition judgment threshold values T1 and T2.

The fluid cooling device 35 is not limited to a water-cooling system. The fluid cooling device 35 may be an air-cooled cooling device which cools the electrical storage device 31 by use of cooling air 135*f* flowed inside the electrical storage device 31 as indicated by the two-dotted chain line in FIG. 1. In this case, the temperature Tz to be detected by the electrical-storage-device temperature detector 37 may be, for example, the internal ambient temperature of the electrical storage device 31, i.e., the temperature of the cooling air 135*f* just cooling the electrical storage device 31, or the temperature of the cooling air 135*f* discharged to the outside of the electrical storage device 31 (after cooling the electrical storage device 31). Also based on the temperature Tz of the cooling air 135*f*, the judgment on the temperature condition of the electrical storage device 31 is allowed to be accurately performed.

Alternatively, the temperature Tz to be detected by the electrical-storage-device temperature detector 37 may be the average module temperature Tave, which is the average temperature of the module temperatures Ta, Tb, Tc, . . . detected by the module-temperature detectors 33. In this case, the temperature-condition judgment section 61 can make a judgment on the temperature condition of the electrical storage device 31 by comparing between the average module temperature Tave (=temperature Tz) detected by the electrical-storage-device temperature detector 37 and the first and second condition judgment threshold values T1 and T2.

Adopting the average module temperature Tave allows the module-temperature detectors 33 to be used also as the electrical-storage-device temperature detector 37, thereby enabling the cost to be reduced in comparison with a case in which the detectors 33 and 37 are individually provided.

The invention is not limited to the foregoing embodiment. Although, in the embodiment, the temperature-condition judgment section 61 is given respective temperature conditions of three stages, namely, "low temperature condition", "ordinary temperature condition", and "high temperature condition", the temperature conditions may be set, for example, in two stages or four stages. Specifically, the temperature-condition judgment section 61 may be given only "low temperature condition" and "ordinary temperature condition", or may be given only "high temperature condition" and "ordinary temperature condition". Alternatively, the temperature-condition judgment section may be given a further temperature condition between "low temperature condition" and "ordinary temperature condition" and/or between "ordinary temperature condition" and "high temperature condition". For instance, for a temperature condition between "low temperature condition" and "ordinary temperature condition", the charge/discharge-electric-power-upper-limit setting section 65 may set the charge-electric-power upper limit and the discharge-electric-power upper limit, based on a temperature between the lowest module temperature Tmin and the average module temperature Tave. Besides, for a temperature condition between "ordinary temperature condition" and "high temperature condition", the charge/discharge-electric-power-upper-limit setting section 65 may set the charge-electric-power upper limit and the discharge-electric-power upper limit, based on a temperature between the average module temperature Tave and the highest module temperature Tmax.

As described above, according to the invention, provided is an electric power control apparatus for a construction machine, the electric power control apparatus being capable of suppressing charge and discharge with respect to an electrical storage device in an anomalous condition. This apparatus includes: a motor; an electrical storage device adapted to perform supply and receive of electric power with the motor, the electrical storage device including a plurality of electrical storage modules; an electrical-storage-device temperature detector which detects a temperature relating to the electrical storage device; a temperature-condition judgment section which judges whether the electrical storage device is under a predetermined non-steady temperature condition, based on the temperature detected by the electrical-storage-device temperature detector; a module-temperature detection section which detects a plurality of module temperatures which are respective temperatures of the electrical storage modules; an adopted-module-temperature selection section which selects the module temperature most deviated to the side of the non-steady temperature condition, from the plurality of module temperatures detected by the module-temperature detection section, as an adopted-module-temperature; and a charge/discharge-electric-power-upper-limit setting section which sets an upper limit of charge electric power and an upper limit of discharge electric power of the electrical storage device, based on the adopted-module-temperature selected by the adopted-module-temperature selection section, when the temperature-condition judgment section judges that the electrical storage device is under the non-steady temperature condition.

According to the electric power control apparatus, in the case where the temperature-condition judgment section judges that the temperature condition of the electrical storage device is the non-steady temperature condition, the adopted-module-temperature selection section selects the module temperature most deviated to the side of the non-steady temperature condition from the module temperatures, as the adopted-module-temperature, and, based on the selected adopted-module-temperature, the charge-electric-power upper limit and the discharge-electric-power upper limit are set. Thus setting the upper limits makes it possible to suppress charge/discharge with respect to the electrical storage device under the anomalous condition.

For instance, the non-steady temperature condition on which the temperature-condition judgment section makes a judgment may include a low temperature condition under which the temperature detected by the electrical-storage-device temperature detector is lower than a predetermined temperature, and the adopted-module-temperature selection section may select a lowest module temperature corresponding to the lowest temperature of the module temperatures detected by the module-temperature detection section, as the adopted-module-temperature, when the temperature-condition judgment section judges that the electrical storage device is under the low temperature condition. This allows charge/discharge with respect to the electrical storage device under the low temperature condition, under which an over-voltage is likely to occur, to be effectively suppressed.

The non-steady temperature condition on which the temperature-condition judgment section makes a judgment may include a high temperature condition under which the temperature detected by the electrical-storage-device temperature detector is higher than a predetermined temperature, and the adopted-module-temperature selection section may select a highest module temperature corresponding to the highest temperature of the module temperatures detected by the module-temperature detection section, as the adopted-moduletemperature, when the temperature-condition judgment section judges that the electrical storage device is under the high temperature condition. This allows charge/discharge with respect to the electrical storage device under the over-heat condition to be effectively suppressed.

It is preferable that: the temperature-condition judgment section judges whether the electrical storage device is under a predetermined ordinary temperature condition, based on the temperature detected by the electrical-storage-device temperature detector; the adopted-module-temperature selection section calculates an average module temperature which is an average of the module temperatures detected by the module-temperature detection section and select the average module temperature as the adopted-module-temperature, when the temperature-condition judgment section judges that the temperature condition of the electrical storage device corresponds to the ordinary temperature condition; and the charge/discharge-electric-power-upper-limit setting section sets the upper limit of charge electric power and the upper limit of discharge electric power of the electrical storage device, based on the average module temperature calculated by the adopted-module-temperature selection section, when the temperature-condition judgment section judges that the temperature condition of the electrical storage device corresponds to the ordinary temperature condition. Setting the upper limits as described above allows the ability of the electrical storage device in the ordinary temperature condition, under which the charge/discharge is not especially required to be suppressed, to be effectively used.

The electrical-storage-device temperature detector may detect, for example, an average module temperature which is an average of the module temperatures detected by the module-temperature detection section. In this case, it is preferable that the temperature-condition judgment section stores a condition judgment threshold value for a judgment on the temperature condition of the electrical storage device and makes the judgment on the temperature condition of the electrical storage device by comparing the average module temperature detected by the electrical-storage-device temperature detector with the condition judgment threshold value.

In the case of the electric power control apparatus according to the invention further including a fluid cooling device adapted to cool the electrical storage device by cooling fluid, the electrical-storage-device temperature detector may detect a temperature of the cooling fluid which is cooling the electrical storage device or which has cooled the electrical storage device. In this case, it is preferable that the temperature-condition judgment section stores a condition judgment threshold value for a judgment on the temperature condition of the electrical storage device and makes the judgment on the temperature condition of the electrical storage device by comparing the temperature of the cooling fluid detected by the electrical-storage-device temperature detector with the condition judgment threshold value.

For instance, in the case of the fluid cooling device adapted to cool the electrical storage device by cooling air flowed inside the electrical storage device, the electrical-storage-device temperature detector may detect an internal ambient temperature of the electrical storage device or a temperature of the cooling air discharged to an outside of the electrical storage device. In the case of the fluid cooling device adapted to cool the electrical storage device by cooling water, the electrical-storage-device temperature detector may detect a temperature of the cooling water which is cooling the electrical storage device or which has cooled the electrical storage device.

This application is based on Japanese Patent Application No. 2013-164263 filed on Aug. 7, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electric power control apparatus for a construction machine, comprising:
    a motor;
    an electrical storage device which performs supply and receive of electric power with the motor, the electrical storage device including a plurality of electrical storage modules;
    an electrical-storage-device temperature detector which detects a temperature relating to the electrical storage device;
    a temperature-condition judgment section which judges whether the electrical storage device is under a predetermined non-steady temperature condition, based on the temperature detected by the electrical-storage-device temperature detector;
    a module-temperature detection section which detects a plurality of module temperatures which are respective temperatures of the electrical storage modules;
    an adopted-module-temperature selection section which selects a module temperature most deviated to a side of the non-steady temperature condition, from the module temperatures detected by the module-temperature detection section, as a adopted-module-temperature; and
    a charge/discharge-electric-power-upper-limit setting section which sets an upper limit of charge electric power and an upper limit of discharge electric power of the electrical storage device, based on the adopted-module-temperature selected by the adopted-module-temperature selection section, when the temperature-condition judgment section judges that the electrical storage device is under the non-steady temperature condition,
    wherein:
    the non-steady temperature condition on which the temperature-condition judgment section makes a judgment includes a low temperature condition, under which the temperature detected by the electrical-storage-device temperature detector is lower than a predetermined temperature; and
    the adopted-module-temperature selection section selects a lowest module temperature corresponding to a lowest temperature of the module temperatures detected by the module-temperature detection section, as the adopted-module-temperature, when the temperature-condition judgment section judges that the electrical storage device is under the low temperature condition.

2. An electric power control apparatus for a construction machine, comprising:
    a motor;
    an electrical storage device which performs supply and receive of electric power with the motor, the electrical storage device including a plurality of electrical storage modules;
    an electrical-storage-device temperature detector which detects a temperature relating to the electrical storage device;

a temperature-condition judgment section which judges whether the electrical storage device is under a predetermined non-steady temperature condition, based on the temperature detected by the electrical-storage-device temperature detector;

a module-temperature detection section which detects a plurality of module temperatures which are respective temperatures of the electrical storage modules;

an adopted-module-temperature selection section which selects a module temperature most deviated to a side of the non-steady temperature condition, from the module temperatures detected by the module-temperature detection section, as an adopted-module-temperature; and a charge/discharge-electric-power-upper-limit setting section which sets an upper limit of charge electric power and an upper limit of discharge electric power of the electrical storage device, based on the adopted-module-temperature selected by the adopted-module-temperature selection section, when the temperature-condition judgment section judges that the electrical storage device is under the non-steady temperature condition, wherein:

the non-steady temperature condition to be determined by the temperature-condition judgment section includes a high temperature condition, under which the temperature detected by the electrical-storage-device temperature detector is higher than a predetermined temperature; and the adopted-module-temperature selection section selects a highest module temperature corresponding to a highest temperature of the module temperatures detected by the module-temperature detection section, as the adopted-module-temperature, when the temperature-condition judgment section judges that the electrical storage device is under the high temperature condition.

3. An electric power control apparatus for a construction machine, comprising:

a motor;

an electrical storage device which performs supply and receive of electric power with the motor, the electrical storage device including a plurality of electrical storage modules;

an electrical-storage-device temperature detector which detects a temperature relating to the electrical storage device;

a temperature-condition judgment section which judges whether the electrical storage device is under a predetermined non-steady temperature condition, based on the temperature detected by the electrical-storage-device temperature detector;

a module-temperature detection section which detects a plurality of module temperatures which are respective temperatures of the electrical storage modules;

an adopted-module-temperature selection section which selects a module temperature most deviated to a side of the non-steady temperature condition, from the module temperatures detected by the module-temperature detection section, as an adopted-module-temperature; and a charge/discharge-electric-power-upper-limit setting section which sets an upper limit of charge electric power and an upper limit of discharge electric power of the electrical storage device, based on the adopted-module-temperature selected by the adopted-module-temperature selection section, when the temperature-condition judgment section judges that the electrical storage device is under the non-steady temperature condition, wherein:

the temperature-condition judgment section judges whether the electrical storage device is under a predetermined ordinary temperature condition, based on the temperature detected by the electrical-storage-device temperature detector; the adopted-module-temperature selection section calculates an average module temperature which is an average of the module temperatures detected by the module-temperature detection section, and to select the average module temperature as the adopted-module-temperature, when the temperature-condition judgment section judges that the electrical storage device is under the ordinary temperature condition; and the charge/discharge-electric-power-upper-limit setting section sets the upper limit of charge electric power and the upper limit of discharge electric power of the electrical storage device, based on the average module temperature calculated by the adopted-module-temperature selection section, when the temperature-condition judgment section judges that the electrical storage device is under the ordinary temperature condition.

4. An electric power control apparatus for a construction machine, comprising:

a motor;

an electrical storage device which performs supply and receive of electric power with the motor, the electrical storage device including a plurality of electrical storage modules;

an electrical-storage-device temperature detector which detects a temperature relating to the electrical storage device;

a temperature-condition judgment section which judges whether the electrical storage device is under a predetermined non-steady temperature condition, based on the temperature detected by the electrical-storage-device temperature detector;

a module-temperature detection section which detects a plurality of module temperatures which are respective temperatures of the electrical storage modules;

an adopted-module-temperature selection section which selects a module temperature most deviated to a side of the non-steady temperature condition, from the module temperatures detected by the module-temperature detection section, as an adopted-module-temperature; and a charge/discharge-electric-power-upper-limit setting section which sets an upper limit of charge electric power and an upper limit of discharge electric power of the electrical storage device, based on the adopted-module-temperature selected by the adopted-module-temperature selection section, when the temperature-condition judgment section judges that the electrical storage device is under the non-steady temperature condition, wherein:

the temperature to be detected by the electrical-storage-device temperature detector is an average module temperature which is an average of the module temperatures detected by the module-temperature detection section; and the temperature-condition judgment section stores a condition judgment threshold value for a judgment on a temperature condition of the electrical storage device and makes the judgment on the temperature condition of the electrical storage device by comparing the average module temperature detected by the electrical-storage-device temperature detector with the condition judgment threshold value.

5. An electric power control apparatus for a construction machine, comprising;
a motor;
an electrical storage device which performs supply and receive of electric power with the motor, the electrical storage device including a plurality of electrical storage modules;
an electrical-storage-device temperature detector which detects a temperature relating to the electrical storage device;
a temperature-condition judgment section which judges whether the electrical storage device is under a predetermined non-steady temperature condition, based on the temperature detected by the electrical-storage-device temperature detector;
a module-temperature detection section which detects a plurality of module temperatures which are respective temperatures of the electrical storage modules;
an adopted-module-temperature selection section which selects a module temperature most deviated to a side of the non-steady temperature condition, from the module temperatures detected by the module-temperature detection section, as an adopted-module-temperature;
a charge/discharge-electric-power-upper-limit setting section which sets an upper limit of charge electric power and an upper limit of discharge electric power of the electrical storage device, based on the adopted-module-temperature selected by the adopted-module-temperature selection section, when the temperature-condition judgment section judges that the electrical storage device is under the non-steady temperature condition; and
a fluid cooling device adapted to cool the electrical storage device by cooling fluid, wherein:
the electrical-storage-device temperature detector detects a temperature of the cooling fluid which is cooling the electrical storage device or which has cooled the electrical storage device; and
the temperature-condition judgment section stores a condition judgment threshold value for an judgment on the temperature condition of the electrical storage device and makes the judgment on the temperature condition of the electrical storage device by comparing the temperature of the cooling fluid detected by the electrical-storage-device temperature detector with the condition judgment threshold value.

6. The electric power control apparatus according to claim 5, wherein: the fluid cooling device is adapted to cool the electrical storage device by cooling air flowed inside the electrical storage device, and the electrical-storage-device temperature detector detects an internal ambient temperature of the electrical storage device or a temperature of the cooling air discharged to an outside of the electrical storage device.

7. The electric power control apparatus according to claim 5, wherein the fluid cooling device is adapted to cool the electrical storage device by cooling water, and the electrical-storage-device temperature detector detects a temperature of the cooling water which is cooling the electrical storage device or which has cooled the electrical storage device.

* * * * *